United States Patent
Kotsuji

(10) Patent No.: US 9,135,736 B2
(45) Date of Patent: Sep. 15, 2015

(54) IMAGE PROCESSING DEVICE AND IMAGE PROCESSING METHOD WHICH GATHER A PLURALITY OF IMAGES WITHIN AN OUTPUT IMAGE

(71) Applicant: KYOCERA DOCUMENT SOLUTIONS INC., Osaka (JP)

(72) Inventor: Takuya Kotsuji, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 189 days.

(21) Appl. No.: 13/852,958

(22) Filed: Mar. 28, 2013

(65) Prior Publication Data

US 2013/0259402 A1    Oct. 3, 2013

(30) Foreign Application Priority Data

Mar. 30, 2012  (JP) .................................. 2012-078969

(51) Int. Cl.
*G06T 11/60* (2006.01)
*H04N 1/00* (2006.01)

(52) U.S. Cl.
CPC ............ *G06T 11/60* (2013.01); *H04N 1/00411* (2013.01); *H04N 1/00421* (2013.01); *H04N 1/00424* (2013.01); *H04N 1/00432* (2013.01); *H04N 1/00453* (2013.01); *H04N 1/00456* (2013.01); *H04N 1/00474* (2013.01); *H04N 1/00482* (2013.01); *H04N 2201/0094* (2013.01)

(58) Field of Classification Search
CPC ...................................................... G06T 11/60
USPC ............................ 382/284; 345/635; 348/588
See application file for complete search history.

(56) References Cited

U.S. PATENT DOCUMENTS

| 5,404,433 | A | 4/1995 | Hosogai |
| 6,253,220 | B1 * | 6/2001 | Le Beux et al. ............... 715/209 |
| 2002/0040375 | A1 | 4/2002 | Simon et al. |
| 2006/0026515 | A1 * | 2/2006 | Balinsky ....................... 715/530 |
| 2008/0123138 | A1 | 5/2008 | Banerjee et al. |

FOREIGN PATENT DOCUMENTS

| JP | H01-255971 A | 10/1989 |
| JP | 06-119134 A | 4/1994 |
| WO | 01/82231 A2 | 11/2001 |

OTHER PUBLICATIONS

An Office Action; "Notice of Reasons for Rejection," issued by the Japanese Patent Office on Jul. 16, 2014, which corresponds to Japanese Patent Application No. 2012-078969 and is related to U.S. Appl. No. 13/852,958.
The extended European search report issued on Aug. 22, 2013, which corresponds to European Patent Application No. 13161701.1-1903 and is related to U.S. Appl. No. 13/852,958.

* cited by examiner

*Primary Examiner* — Yubin Hung
(74) *Attorney, Agent, or Firm* — Studebaker & Brackett PC

(57) ABSTRACT

A image processing device includes an image selection means and an image gathering means. The image selection means receives a plurality of rectangular selected images selected by user's operation. The image gathering means overlays specific sides of two selected images on each other among the plurality of selected images to gather the plurality of selected images within an output image corresponding to predetermined paper.

11 Claims, 15 Drawing Sheets

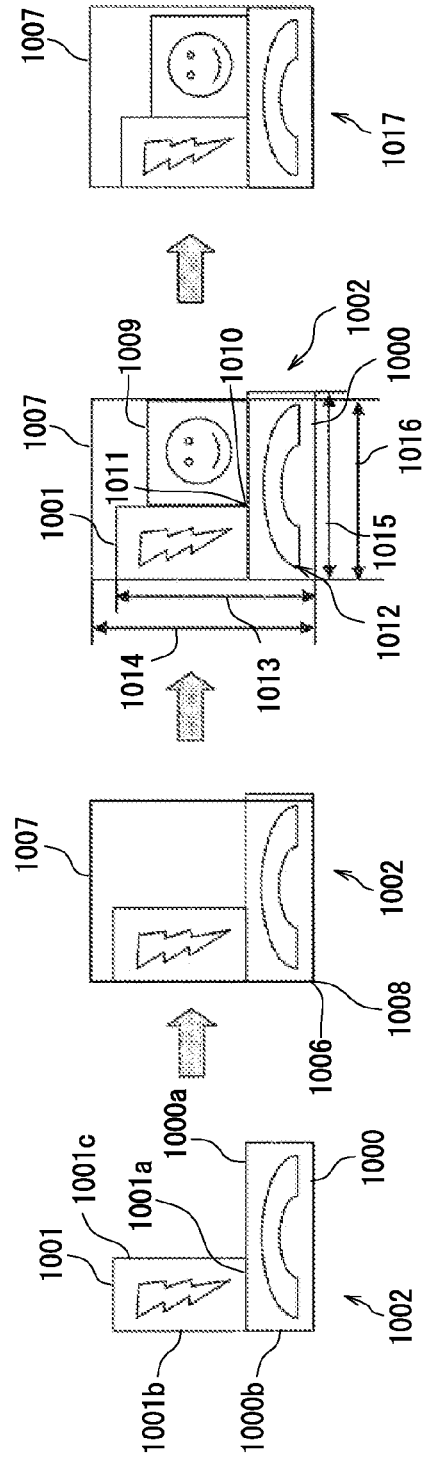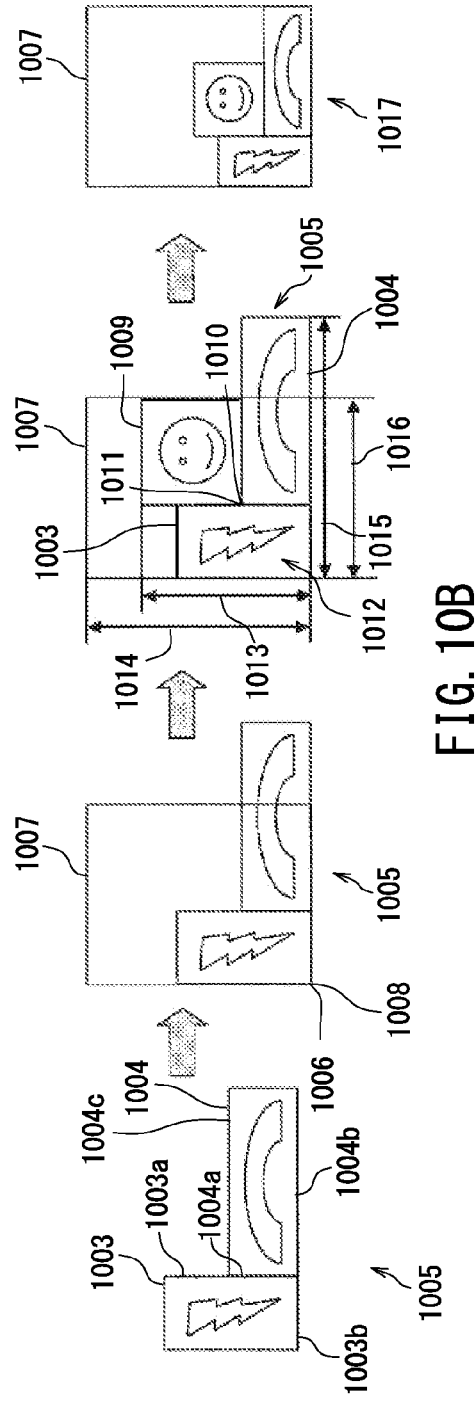

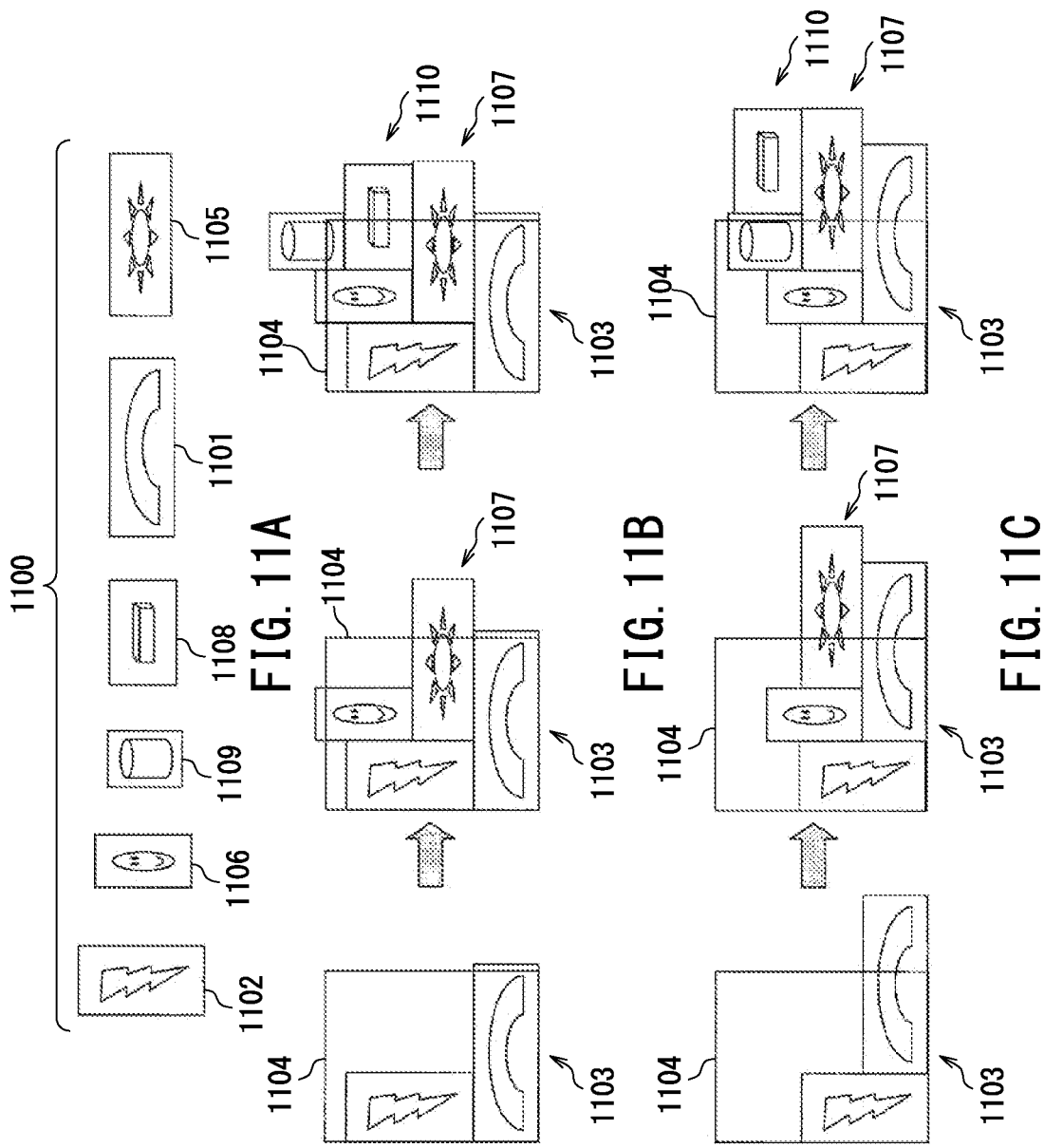

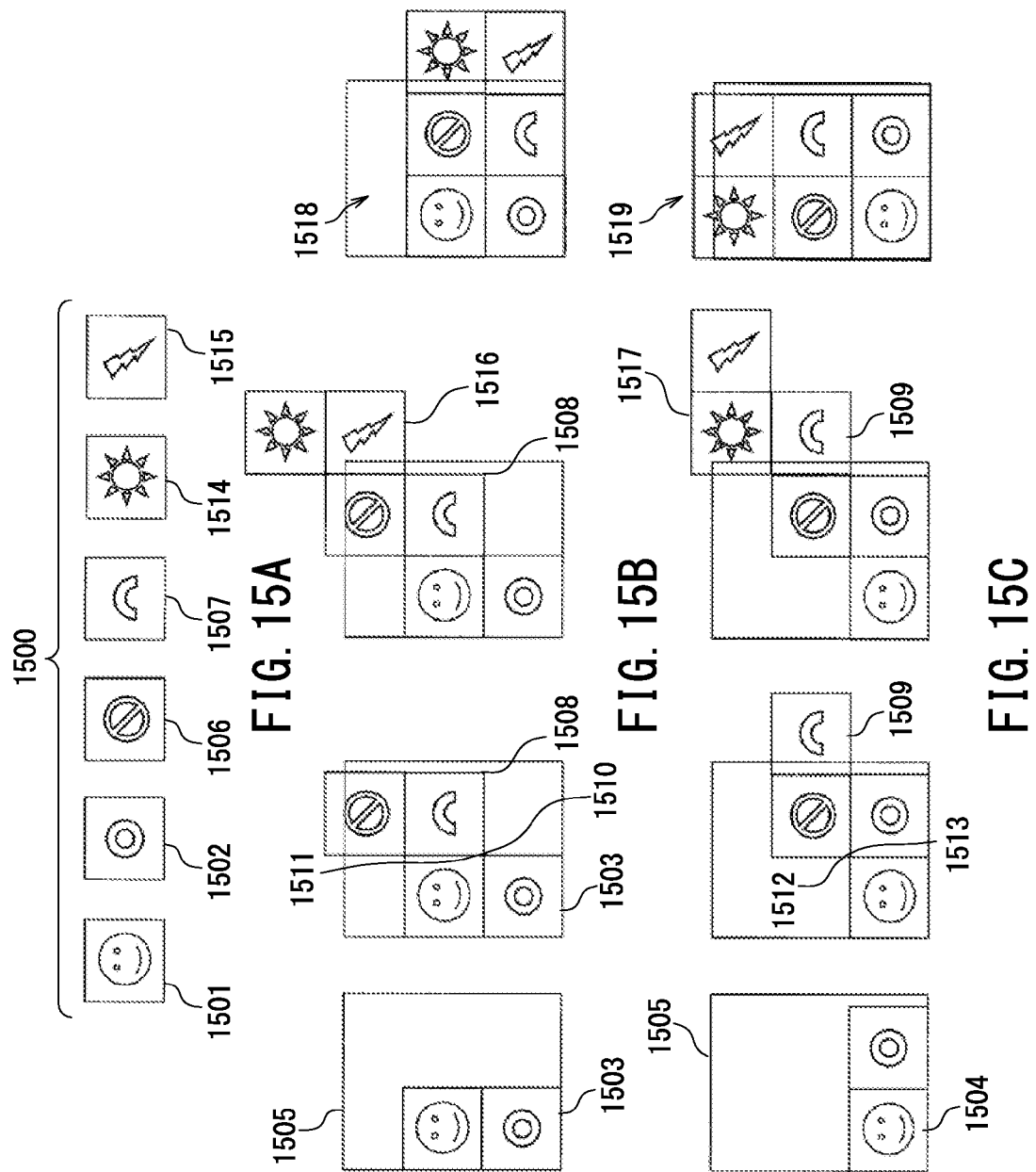

IMAGE PROCESSING DEVICE AND IMAGE PROCESSING METHOD WHICH GATHER A PLURALITY OF IMAGES WITHIN AN OUTPUT IMAGE

INCORPORATION BY REFERENCE

The present application claims priority under 35 U.S.C. §119 to Japanese Patent Application No. 2012-078969, filed Mar. 30, 2012. The contents of this application are incorporated herein by reference in their entirety.

BACKGROUND

The present disclosure relates to image processing devices and image processing methods and specifically relates to an image processing device and an image processing method which can automatically gather a plurality of images with a blank reduced.

Various types of image processing devices have been proposed which have a synthesizing function of synthesizing desired parts of plural pieces of image information for recording to a recording medium.

For example, a scanner reads image information on an original document. A memory stores the read image information. A display device displays it on its display screen. Thereafter, the image information in the memory is processed by operating a stylus or the like on the image information displayed on the display screen to store desired part of the image information into an additional memory. This series of processes is performed on a plurality of original documents. After the additional memory stores image information in which each desired part of the image information of the original documents are synthesized, a printer records the stored image information onto a recording medium.

However, the image processing devices of the above type can detect neither the input size of image information read by the scanner nor the output size of image information that the printer should output. For this reason, respective image information cannot be displayed maximally on the screen of the display device, thereby lowering the operability in processing the image information. Further, desired parts cannot be extracted from plural pieces of image information different in size for synthesis in desired size.

In order to solve the above problems, some image processing device reads plural pieces of image information, extracts and aggregates their respective desired parts into a single image, and then records the aggregated one onto a recording medium. In the image processing device, when the input size of image information is set at reading the image information by an image reading means, a first storage means stores the image information read by the image reading means according to the set input size. Then, the image processing device displays the stored image information on the display device through a first image displaying means. When the output size of the image information is set at processing of the image information stored in the first storage means by an image processing means, a second storage means stores the image information processed by the image processing means according to the set output size. Further, the image processing device displays the stored image information on the display device through a second image displaying means and records it on a recording medium by a record output means. Accordingly, a variety of image information can be always displayed maximally on the screen of the display device. Further, desired parts can be extracted from respective plural pieces of image information different in size and be synthesized into one in desired size.

SUMMARY

An image processing device according to the present disclosure includes an image selection means configured to receive a plurality of rectangular selected images selected by user's operation. The image processing device further includes an image gathering means configured to overlay specific sides of two selected images on each other among the plurality of selected imaged to gather the plurality of selected images within an output image corresponding to predetermined paper.

BRIEF DESCRIPTION OF THE DRAWINGS

FIG. 10 presents a first illustration (FIG. 10A) showing one example of gathering of three selected images according to the embodiment of the present disclosure and a second illustration (FIG. 10B) showing one example of gathering of the three selected images according to one embodiment of the present disclosure.

FIG. 11 presents an illustration (FIG. 11A) showing one example of search for six selected images according to one embodiment of the present disclosure, a first illustration (FIG. 11B) showing one example of gathering of the six selected images according to the embodiment of the present disclosure, and a second illustration (FIG. 11C) showing one example of gathering of the six selected images according to the embodiment of the present disclosure.

FIG. 15 presents an illustration (FIG. 15A) showing one example of search for six square selected images according to one embodiment of the present disclosure, a first illustration (FIG. 15B) showing one example of gathering of the six square selected images according to the embodiment of the present disclosure, and a second illustration (FIG. 15C) showing one example of gathering of the six square selected image according to the embodiment of the present disclosure.

DETAILED DESCRIPTION

Embodiments of an image forming device using an image processing device according to the present disclosure will be described below with reference the accompanying drawings for comprehension of the present disclosure. It is noted that the following embodiments are specific examples of the present disclosure and do not serve to limit the technical scope of the present disclosure. In addition, the character S affixed before numerals in the flowcharts denotes a step.

An image forming device including an image processing device according to one embodiment of the present disclosure and a post processing device will be described first.

Figure 1:
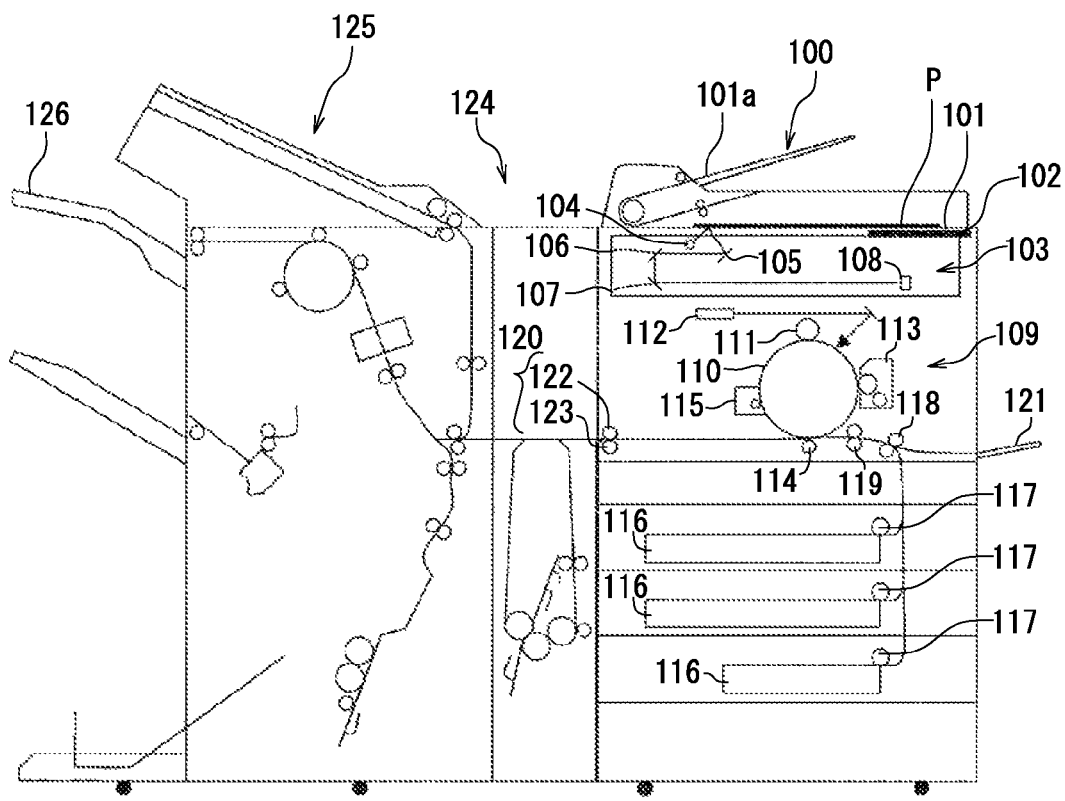
FIG. 1 is a conceptual diagram showing an overall configuration of the inside of a multifunction peripheral according to the present disclosure.

FIG. 1 is a schematic illustration showing an image forming device using an image processing device according to one embodiment of the present disclosure. In the drawing, detailed parts irrelevant directly to the present disclosure are omitted. It is noted that the image forming device using the image processing device according to the present disclosure may be, for example, a printer, a scanner, or a multifunction peripheral having functions of, for example, a printer, a copier, a scanner, a facsimile machine, etc. and works as an image forming device having functions, such as a copying function, a scanning function, a faxing function, a printing function, etc.

Operation of a multifunction peripheral (MFP) 100 that performs, for example, a copying function will be briefly described below.

First, the user turns on power of the multifunction peripheral 100, places an original document P on a copy holder 101 or an auto document feeder 101a provided on the upper surface of the multifunction peripheral 100, and sets a copying function via an operation section 102. The operation section 102 displays an operating screen (an initial screen or the like) relating to the copying function that the multifunction peripheral 100 provides. A plurality of config keys relating to the copying function are displayed in a selectable manner. The user inputs a setting condition relating to the copying function through the operating screen. When the user finishes inputting the setting condition, he or she pushes a start key provided in the operation section 102 to allow the multifunction peripheral 100 to start performing the copying function.

When the multifunction peripheral 100 starts performing the copying function, light irradiated from a light source 104 is reflected by the original document P placed on the copy holder 101 in an image reading section 103. Alternatively, in the case where original documents P are placed on the auto document feeder 101a, the auto document feeder 101a conveys the original documents P sheet by sheet to an image reading site of the image reading section 103. Then, the light source 104 irradiates the light to the image reading site to allow the light to be reflected by the original document P.

Mirrors 105, 106, 107 bring the reflected light to an image sensor 108. The image sensor 108 performs photoelectric conversion on the brought light for basic correction, picture processing, compression, etc. to generate image data corresponding to the original document P.

Incidentally, it is an image forming section 109 that serves as a drive section that transfers the image data as a toner image. The image forming section 109 includes a photosensitive drum 110. The photosensitive drum 110 rotates at given speed in a predetermined direction. Around the photosensitive drum 110, a charger 111, an exposure unit 112, a developing unit 113, a transfer unit 114, a cleaning unit 115, etc. are arranged in this order from the upstream in the direction of the rotation.

The charger 111 electrostatically charges the surface of the photosensitive drum 110 uniformly. The exposure unit 112 irradiates a laser to the surface of the electrostatically charged photosensitive drum 110 on the basis of the image data to form an electrostatic latent image. The developing unit 113 allows toner to adhere to the conveyed electrostatic latent image to form a toner image. The transfer unit 114 transfers the formed toner image to a recording medium (e.g., a sheet, paper, etc.). Hereinafter, the recording medium will be referred to as paper. The cleaning unit 115 removes surplus toner remaining on the surface of the photosensitive drum 110. This series of processes is performed through rotation of the photosensitive drum 110.

A plurality of paper feed cassettes 116 provided in the multifunction peripheral 100 convey the paper. In the conveyance, the paper is pulled out to a conveyance path by a pickup roller 117 from any one of the paper feed cassettes 116. Each of the paper feed cassettes 116 accommodates a different type of paper and feeds the paper according to the output condition.

The paper pulled out to the conveyance path is sent between the photosensitive drum 110 and the transfer unit 114 by a conveyance roller 118 and a paper stop roller 119. After the sending, the transfer unit 114 transfers the toner image to the paper. Then, the paper is conveyed to a fusing unit 120. It is noted that the paper conveyed to the conveyance roller 118 may be conveyed from a manual feed tray 121 provided in the multifunction peripheral 100.

During the time when the paper to which the toner image is transferred passes between a heating roller 122 and a pressure roller 123 provided in the fusing unit 120, heat and pressure are applied to the toner image, thereby fixing a visible image onto the paper. The heat quantity of the heating roller 122 is optimally set according to the type of the paper for appropriate fixing. When the visible image is fixed on the paper, image formation is completed. The paper on which the visible image is fixed is conveyed to a folding unit 124 via the fusing unit 120.

The conveyed paper is subjected to folding by the folding unit 124 in accordance with the setting condition input by the user. Unless the folding is input, the paper only passes through the folding unit 124.

Alternatively, in the case where the user inputs a setting condition for post-processing (e.g., stapling, punching, saddle stitching, etc.), the paper, which has passed through the folding unit 124, is conveyed to a saddle stitching device 125 for the set post-processing. In the case of, for example, saddle stitching set as the post-processing, the saddle stitching device 125 performs punching on each sheet of the paper in a punching section (not shown) and performs stapling then on all of the sheets of the paper in a stapling section (not shown).

The paper or a sheaf of paper subjected to the post-processing is stacked on and accommodated in an exit tray 126 of the saddle stitching device 125. It is noted that the folding unit 124 and the saddle stitching device 125 are collectively referred to as the post processing device (finisher).

According to the above processes, the multifunction peripheral 100 provides the copying function to the user.

Figure 2:
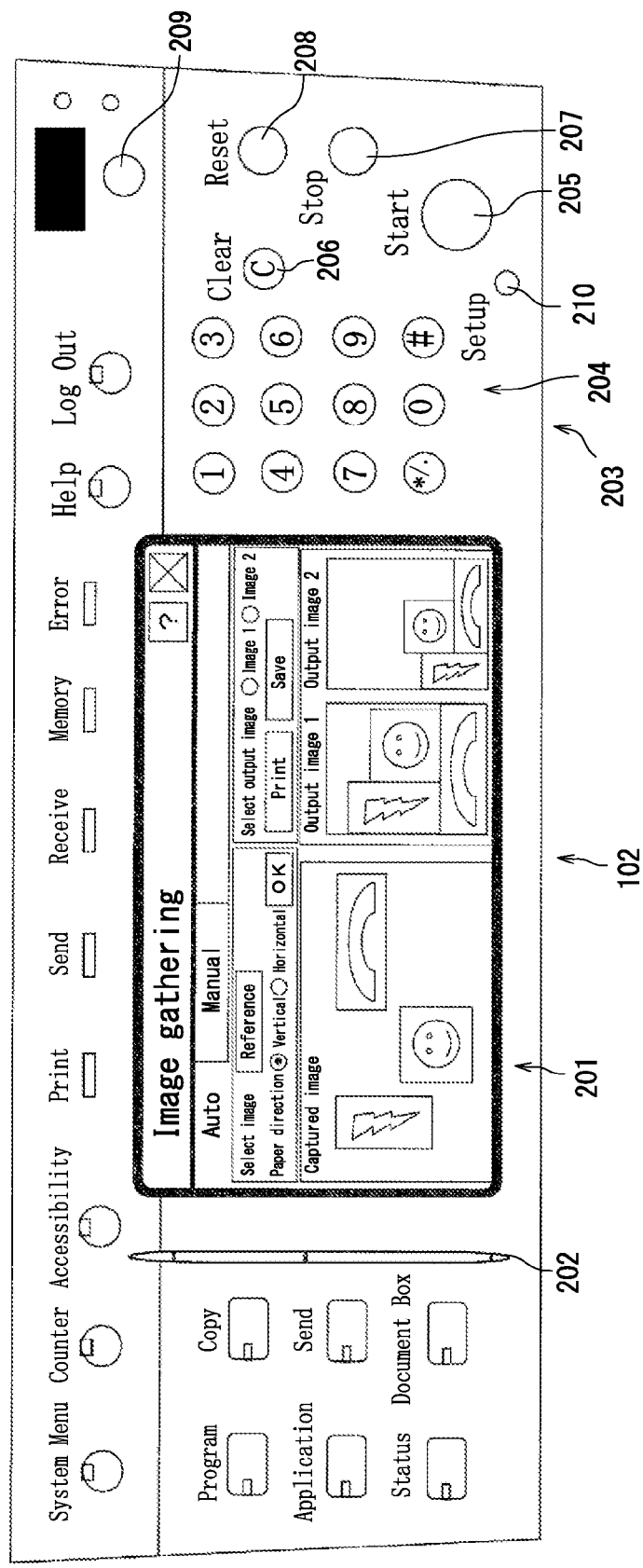
FIG. 2 is a conceptual diagram showing an overall configuration of an operation section according to the present disclosure.

FIG. 2 is a conceptual diagram showing an overall configuration of the operation section according to one embodiment of the present disclosure. Through the operation section 102, the user inputs a setting condition for image formation as above or confirms the input setting condition. In order to input the setting condition, a touch panel 201 (operation panel), a stylus 202, or an operation key 203 provided in the operation section 102 may be used.

The touch panel 201 has both a function of inputting a setting condition and a function of displaying the setting condition. That is, pushing a key in a screen displayed on the touch panel 201 results in input of a setting condition corresponding to the pushed key.

On the back surface of the touch panel 201, a display section (not shown) of a liquid crystal display (LCD) or the like is provided to display the operating screen, such as the initial screen or the like. The stylus 202 is provided in the vicinity of the touch panel 201. When the user makes the tip end of the stylus 202 come in contact with the touch panel 201, a sensor provided below the touch panel 201 detects the contact of the tip end.

Further, a predetermined number of operation keys 203 are provided in the vicinity of the touch panel 201, which include, for example, numeric keys 204, a start key 205, a clear key 206, a stop key 207, a reset key 208, and a power key 209.

Figure 3:
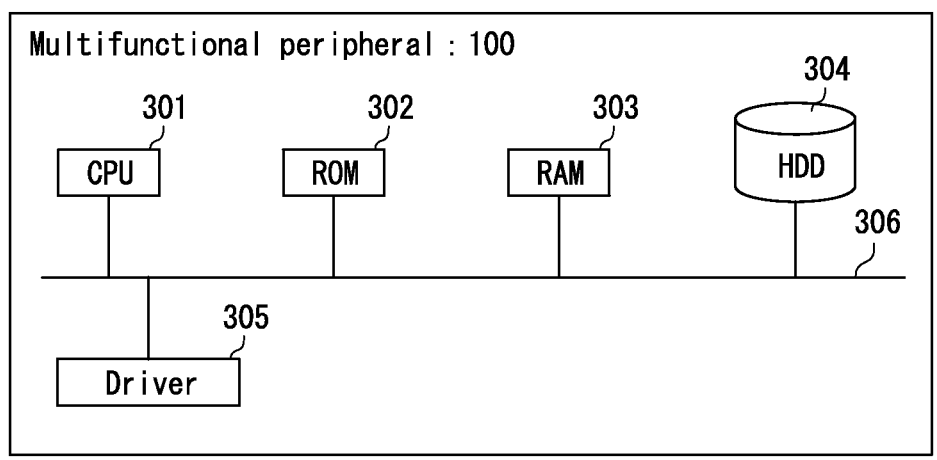
FIG. 3 is a diagram showing a configuration of control hardware of the multifunction peripheral according to the present disclosure.

A configuration of control hardware for the multifunction peripheral 100 will be described next with reference to FIG. 3. FIG. 3 is an illustration showing a configuration of control hardware of the multifunction peripheral 100 according to the present disclosure. In FIG. 3, details of parts irrelevant directly to the present disclosure are omitted.

Referring to a control circuit of the multifunction peripheral 100, a central processing unit (CPU) 301, a read only memory (ROM) 302, a random access memory (RAM) 303, a hard disk drive (HDD) 304, and a driver 305 corresponding to the respective drive sections are connected to one another through an internal bus 306.

The CPU 301 executes programs stored in the ROM 302, the HDD 304, etc. using, for example, the RAM 303 as a work field and receives and provides data or an instruction from the driver 305 or the operation section 102 on the basis of the execution result to control the operation of the respective drive sections shown in FIGS. 1 and 2. As to each means (shown in FIG. 4) other than the drive sections, which will be described later, the CPU 301 executes a program to realize the corresponding means of the image processing device 400 shown in FIG. 4. The ROM 302 stores programs and data for realizing each means described below. The control circuit of the multifunction peripheral 100 shown in FIG. 3 has, but is not limited to, the configuration in which the CPU 301, the ROM 302, the RAM 303, the HDD 304, and the driver 305 corresponding to the respective drive sections are connected to one another through the internal bus 306. Any of these elements can be dispensed with. Or, any of the elements may be replaced by an alternative element. For example, any of the means of the image processing device 400 may be configured by a dedicated circuit rather than through execution of the corresponding program by the CPU 301. It is noted that the aforementioned program and the aforementioned data may be stored in an external storage medium. Examples of the external storage medium may include a magnetic disk, an optical disk, and a flush memory.

The image processing device 400 according to the present disclosure includes an image selection means 403 configured to receive a plurality of rectangular selected images selected by user's operation and an image gathering means 405 configured to overlay specific sides of two selected images on each other among the plurality of selected images to gather the plurality of selected images within an output image corresponding to predetermined paper. The image processing device 400 further includes a display reception means 401 and a file storage means 404.

Figure 4:
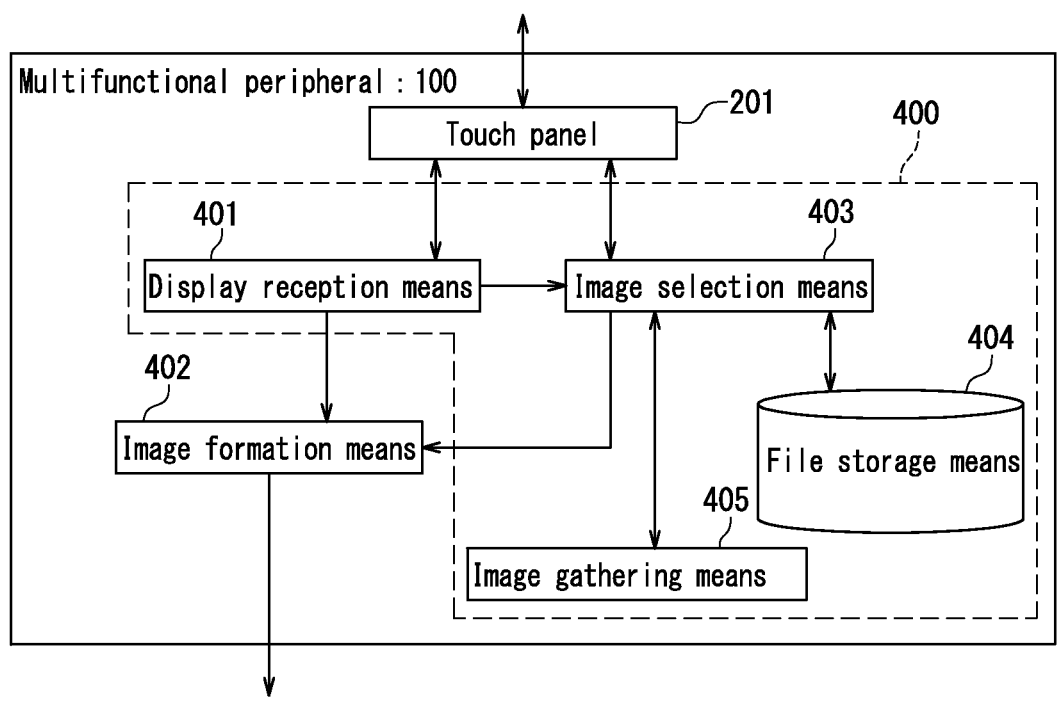
FIG. 4 is a functional block diagram of a multifunction peripheral according to one embodiment of the present disclosure.
Figure 5:
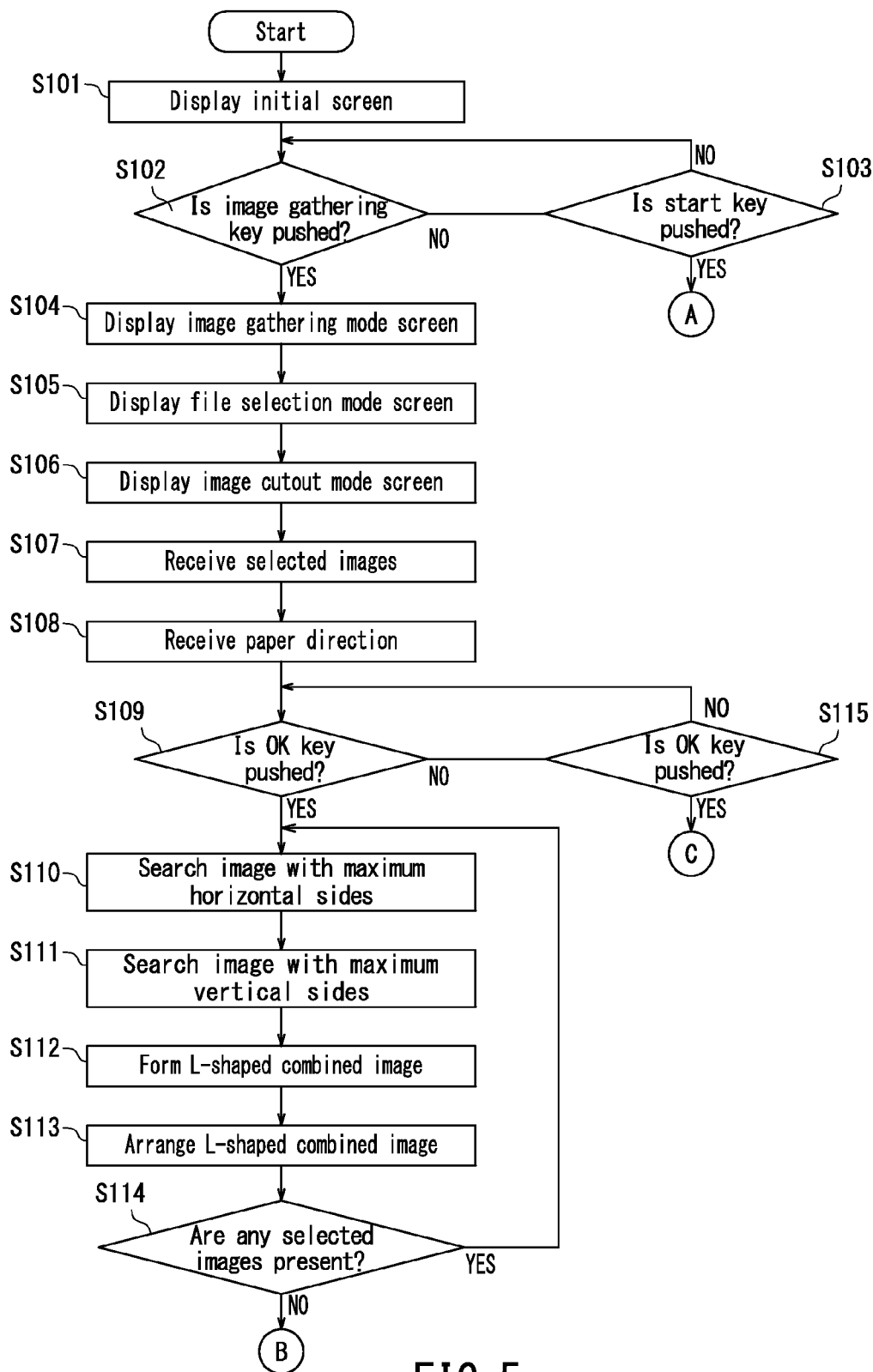
FIG. 5 is a first flowchart for depicting an execution sequence in one embodiment of the present disclosure.
Figure 6:
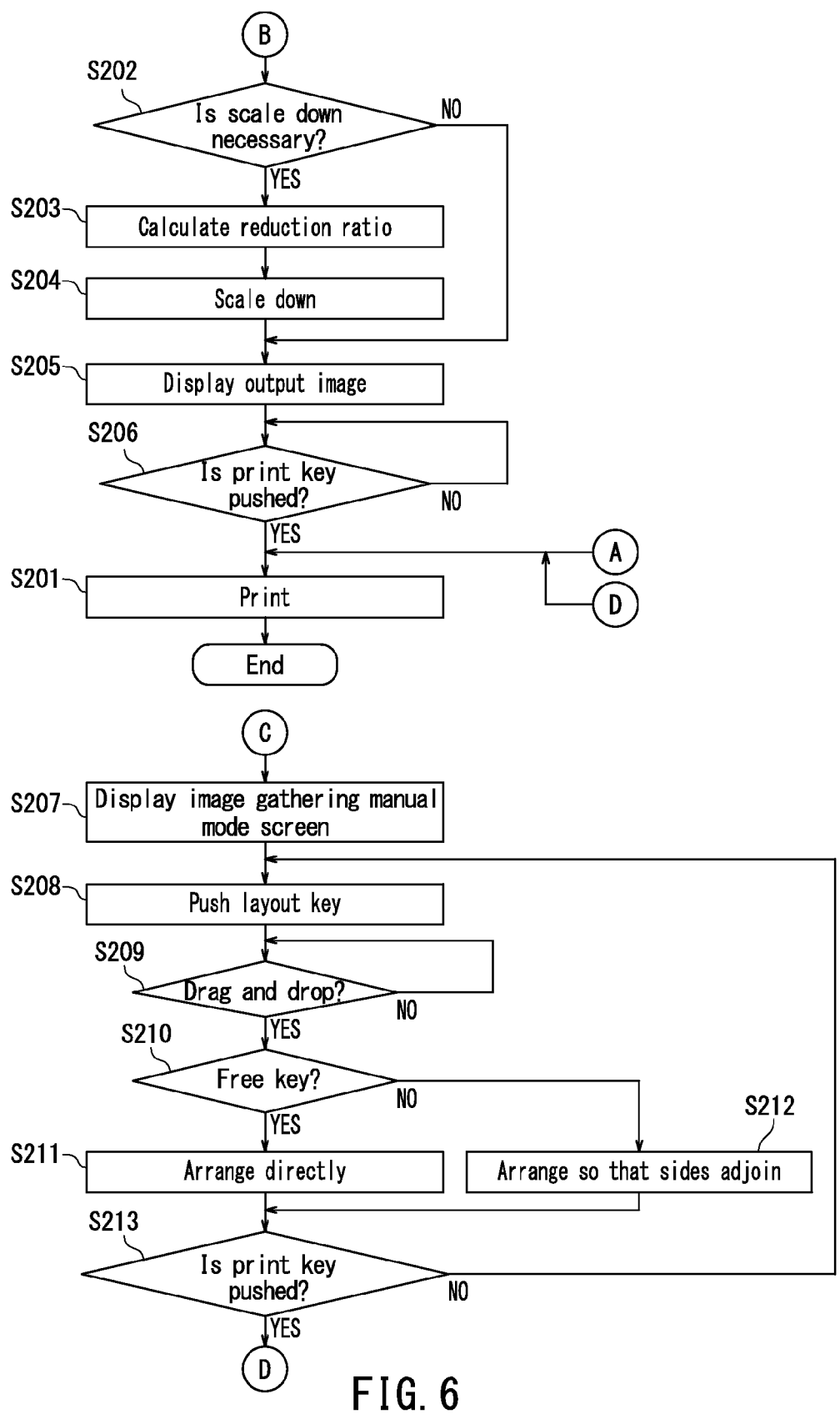
FIG. 6 is a second flowchart for depicting the execution sequence in the embodiment of the present disclosure.

With reference to FIGS. 4-6, description will be made next about a configuration and an execution sequence according to one embodiment of the present disclosure. FIG. 4 is a functional block diagram of the multifunction peripheral using the image processing device according to the present disclosure. Further, FIGS. 5 and 6 are flowcharts for depicting the execution sequence according to the present disclosure.

First, when the user turns on power of the multifunction peripheral 100, the display reception means 401 of the multifunction peripheral 100 allows the touch panel 201 of the operation section 102 to display a predetermined print screen (initial screen) (FIG. 5: S101).

Figure 7A:
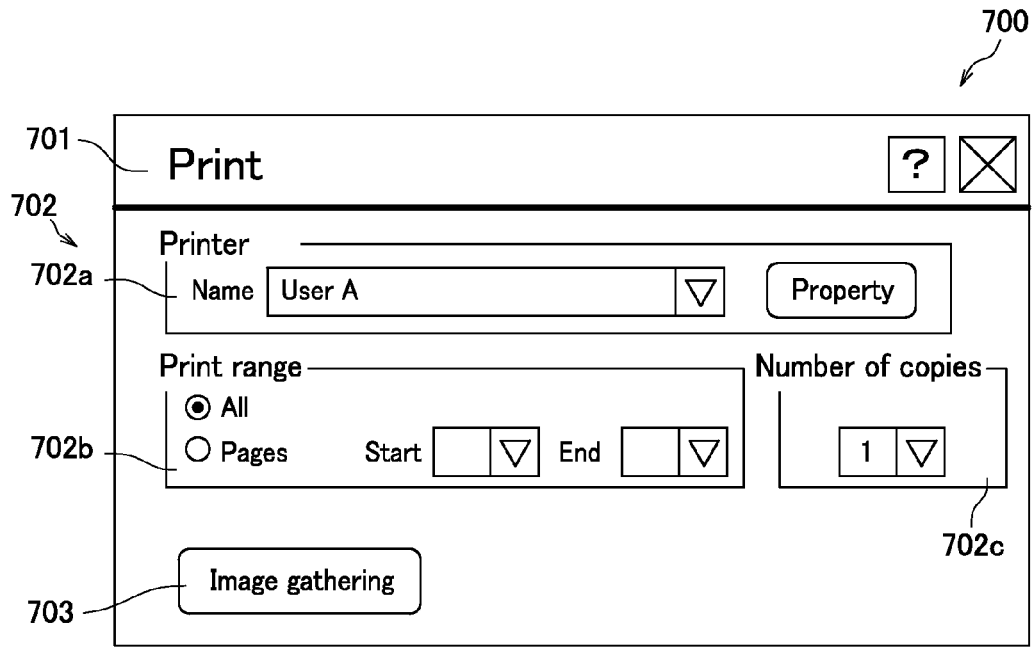
FIG. 7 presents an illustration (FIG. 7A) showing one example of a print screen displayed on a touch panel according to one embodiment of the present disclosure and an illustration (FIG. 7B) showing one example of an image gathering mode screen displayed on the touch panel according to one embodiment of the present disclosure.

The print screen 700 displays, as shown in FIG. 7A, a message 701 that invites print setting, a setting condition field 702 for input of a print setting condition, and an image gathering key 703 for gathering of a plurality of images. It is noted that there are displayed in the setting condition field 702, for example, a device selection field 702a for selection of an image forming device (multifunction peripheral) that is to perform printing, a print range setting field 702b for setting of a print range (the number of pages), and a copy number field 702c for setting of the number of copies.

Suppose now that the user inputs a predetermined setting condition to the setting condition field 702 without pushing the image gathering key 703 (FIG. 5: NO in S102) and pushes the start key 205 of the operation section 102. The display reception means 401 then receives the input of the setting condition and the pushing of the start key 205 (FIG. 5: YES in S103). An image formation means 402 of the multifunction peripheral 100 then performs image formation (printing) of a predetermined image onto the paper on the basis of the setting condition (FIG. 6: S201). This corresponds to a normal copying function.

By contrast, when the user pushes the image gathering key 703, while viewing the print screen 700, the display reception means 401 receives the pushing of the image gathering key 703 (FIG. 5: YES in S102) and notifies the image selection means 403 of the pushing. Upon receipt of the notification, the image selection means 403 allows the touch panel 201 to display the image gathering mode screen 704 for gathering of a plurality of images into a single image (FIG. 5: S104).

Figure 7B:
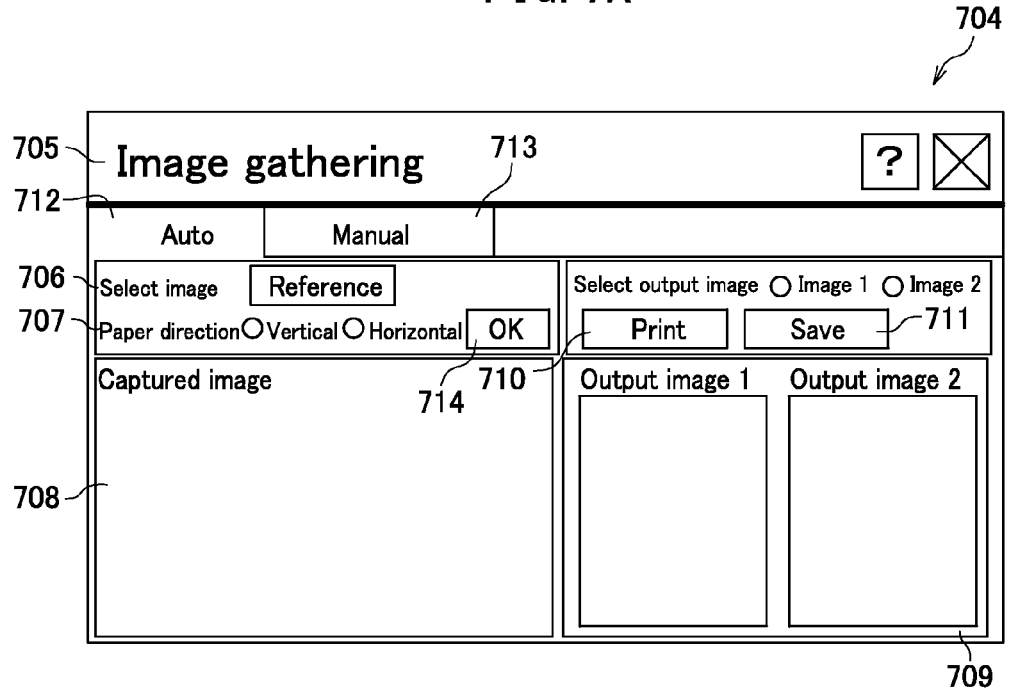

As show in FIG. 7B, the image gathering mode screen 704 displays a message 705 that invites image gathering, a reference key 706 for image selection, a direction key 707 for selection between the vertical direction and the horizontal direction of the paper, a captured image field 708 for displaying a selected image, an output image field 709 for displaying a single image into which a plurality of images are gathered (output image for image formation which corresponds to paper), a print key 710 for printing the output image, and a save key 711 for saving the output image.

Here, the image gathering mode screen 704 further displays an auto mode key 712 for automatic gathering of a plurality of selected images and a manual mode key 713 for gathering of a plurality of images by the user's operation. Now, the auto mode key 712 is being pushed (selected). In the state where the auto mode key 712 is being pushed, the image gathering mode screen 704 displays an OK key 714 for automatic gathering of the selected images. The case when the manual mode key 713 is pushed will be described later.

Now, when the user pushes the reference key 706, while viewing the image gathering mode screen 704, the image selection means 403 receives the pushing of the reference key 706 to allow the touch panel 201 to display a file selection mode screen 800 for selection of a file (data) including the images (FIG. 5: S105).

Figure 8A:
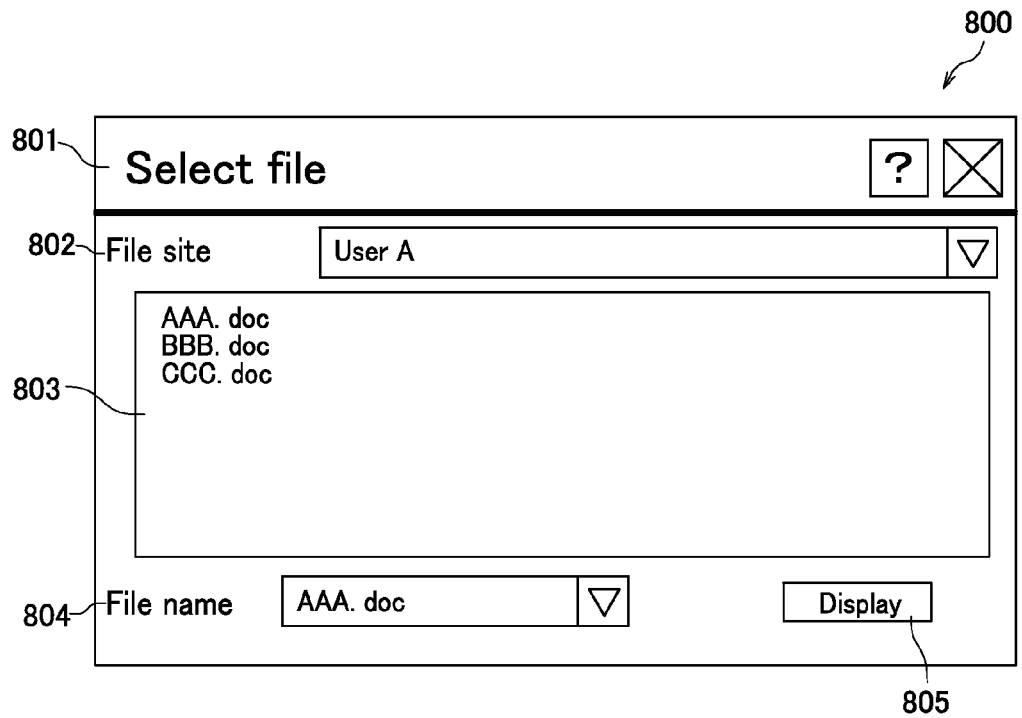
FIG. 8 presents an illustration (FIG. 8A) showing one example of a file selection mode screen displayed on the touch panel according to one embodiment of the present disclosure and an illustration (FIG. 8B) showing one example of an image cutout mode screen displayed on the touch panel according to the embodiment of the present disclosure.

The file selection mode screen 800 displays, as shown in FIG. 8A, a message 801 that invites file selection, a file site selection field 802 for selection of a site where a file is stored, a file name display field 803 for displaying the name of a file stored in a selected file site, a file name selection field 804 for selection of the name of a given file, and a display key 805 for displaying a file image of the file with the selected name.

When the user selects a specific site (e.g., "¥¥C:") through the file site selection field 802, while viewing the file selection mode screen 800, the image selection means 403 obtains the name of a file stored in the selected specific site by referencing a file storage means 404 and then displays the obtained file name in the file name display field 803 in a list form.

Here, the image selection means 403 displays, in the file name selection field 804, the file name displayed in the file name display field 803 in a selectable manner. Accordingly, the user selects a specific file name (e.g., "AAA.doc") through the file name selection field 804 and pushes the display key 805. Then, the image selection means 403 reads out a file image with the selected file name from the file storage means 404 and allows the touch panel 201 to display an image cutout mode screen 806 that enables cutout of a desired image from the file image (FIG. 5: S106).

Figure 8B:
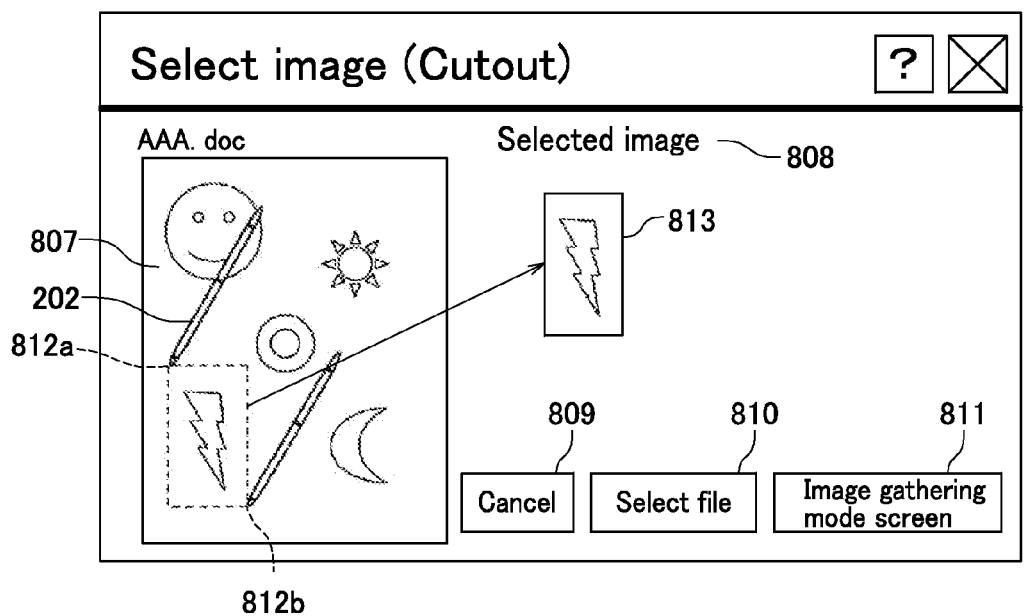

The image cutout mode screen 806 displays, as shown in FIG. 8B, the selected file image 807, a selected image display field 808 that displays an image selected (cut out) from the file image, a cancel key 809 for cancellation of the selected image, a file selection key 810 for return to the file selection mode screen 800, and an image gathering mode screen key 811 for return to the image gathering mode screen 704.

Any method is employable as a method for selecting and cutting out an image from the file image 807. For example, when the user specifies (selects) two points 812a and 812b with the use of the stylus 202 so as to surround a to-be-cut image of the file image 807, while viewing the image cutout mode screen 806, the image selection means 403 receives a rectangular image 813 including the two points 812a, 812b as a selected image (cutout image) to allow the selected image 813 to be displayed in the selected image display field 808.

Accordingly, the user is enabled to select and cut out the specified selected image 813 freely from the predetermined file image 807. It is noted that pushing the cancel key 809 can result in cancellation of the cut selected image 813.

Figure 9A:
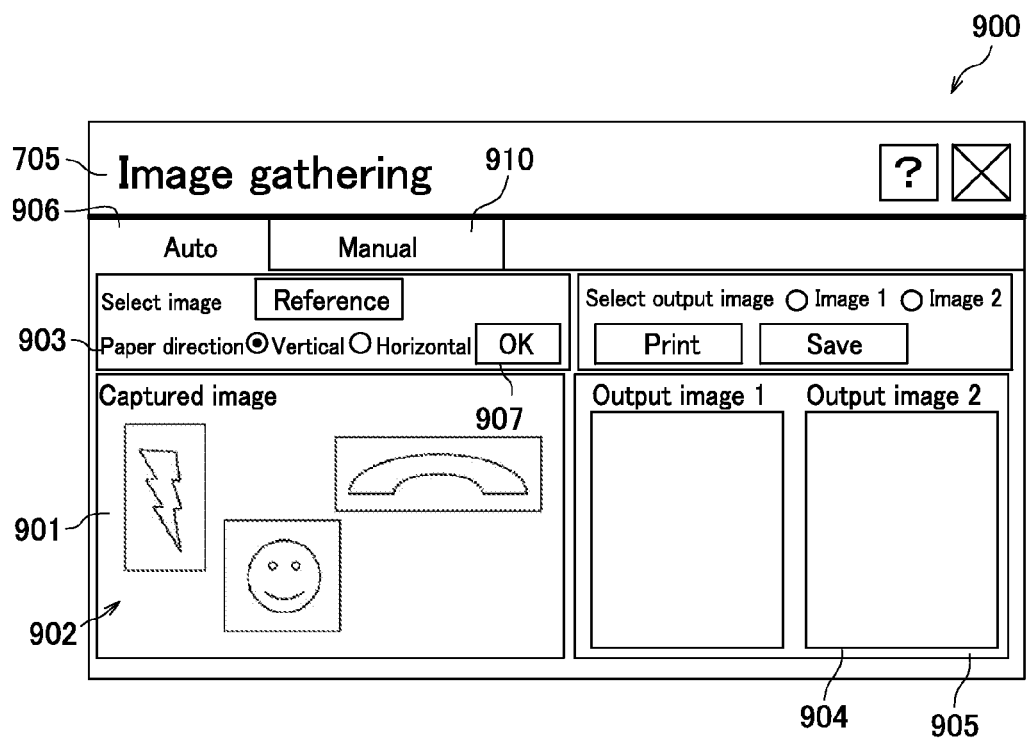
FIG. 9 presents an illustration (FIG. 9A) showing one example of the image gathering mode screen that displays selected images according to one embodiment of the present disclosure and an illustration (FIG. 9B) showing one example of search for three selected images according to one embodiment of the present disclosure.

Thereafter, when the user selects and cuts out a predetermined number of selected images 813 of the file image 807 on the image cutout mode screen 806 and pushes the image gathering mode screen key 811, the image selection means 403 receives the predetermined number of selected images 813 (FIG. 5: S107) to allow the predetermined number of selected images 902 to be displayed in a captured image field 901 of the image gathering mode screen 900, as shown in FIG. 9A.

Subsequently, when the user pushes the direction key 903 indicating a predetermined direction of the paper (e.g., vertical direction), while viewing the image gathering mode screen 900, the image selection means 403 receives the paper direction corresponding to the direction key 903 (FIG. 5: S108) to allow an output image 904 in the corresponding paper direction to be displayed in an output image field 905.

When the user further pushes an OK key 907 with the auto mode key 906 pushed, the image selection means 403 receives the pushing of the auto mode key 906 and the OK key 907 (FIG. 5: YES in S109) to notify the image gathering means 405 of each pushing. Upon receipt of the notification, the image gathering means 405 repeats overlaying (adjunction) of specific sides of two selected images 902 among the plurality of selected images 902 to gather the plurality of selected image 902 within the output image corresponding to the predetermined paper.

Figure 9B:
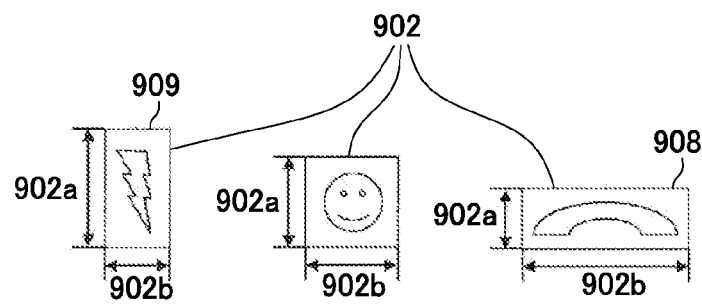

Specifically, the image gathering means 405 first calculates vertical sides 902a and horizontal sides 902b of each of the plurality of selected images 902, as shown in FIG. 9B, and compares a horizontal side 902b of one of the selected images 902 with a horizontal side 902b of another selected image 902 to search a selected image 908 (horizontal selected image) having a maximum horizontal side 902b among the plurality of selected images 902 (FIG. 5: S110). Further, the image gathering means 405 compares a vertical side 902a of one of the selected images 902 with a vertical side 902a of another selected image 902 to search a selected image 909 (vertical selected image) having a maximum vertical side 902a among the plurality of selected images 902 (FIG. 5: S111).

It is noted that in the case where a plurality of selected images 902 having maximum horizontal sides 902b that are the same in size are present among the plurality of selected images 902 when the image gathering means 405 searches the horizontal selected image 908, a selected image 902 that is selected earlier by the user is searched as the horizontal selected image 908. The same is applied to search for the vertical selected image 909.

Then, the image gathering means 405 overlays one specific side of the searched horizontal selected image 908 on one specific side of the searched vertical selected image 909 to form an L-shaped combined image (FIG. 5: S112).

Here, in order for the image gathering means 405 to form the L-shaped combined image, the following two adjunction/formation methods are executed. That is, the first adjunction/formation method is as follows. The image gathering means 405 overlays a lower side 1001a of a vertical selected image 1001 on an upper side 1000a of a horizontal selected image 1000, and then, aligns a left side 1000b orthogonal to the overlaid side of the horizontal selected image 1000 with a left side 1000b orthogonal to the overlaid side of the vertical selected image 1001 to form an L-shaped combined image 1002, as shown in FIG. 10A. In this adjunction/formation method, the L-shaped combined image 1002 is vertically long. Accordingly, when the paper direction is the vertical direction, the blank can be reduced as small as possible.

Referring to the second adjunction/formation method, the image gathering means 405 overlays a left side 1004a of a horizontal selected image 1004 on a right side 1003a of a vertical selected image 1003, and then, aligns a lower side 1003b orthogonal to the overlaid side of the vertical selected image 1003 with a lower side 1004b orthogonal to the overlaid side of the horizontal selected image 1004 to form an L-shaped combined image 1005, as shown in FIG. 10B. In this adjunction/formation method, the L-shaped combined image 1005 is horizontally long. Accordingly, when the paper direction is the horizontal direction, the blank can be reduced as small as possible.

After the image gathering means 405 forms the L-shaped combined images 1002, 1005, as shown in FIGS. 10A and 10B, the L-shaped combined images 1002, 1005 are arranged within output images 1007 so that predetermined outer corners 1006 (e.g., preset lower left corners) of the formed L-shaped combined images 1002, 1005 are set at inner corners 1008 (e.g., preset lower left corners) of the output images 1007 in the directions corresponding to the received paper direction (vertical direction) (FIG. 5: S113). Thus, the L-shaped combined images 1002, 1005 can be arranged within the output images 1007 with a smaller blank formed.

Where a selected image 902 is still present after arrangement of the L-shaped combined images 1002, 1005 (FIG. 5: YES in S114), the routine returns to S110 to make the image gathering means 405 perform, on the present selected image 902, repetition of search for a horizontal selected image and a vertical selected image and formation and arrangement of L-shaped combined images (FIG. 5: S110→S111→S112→S113).

For example, where three selected images 902 are present as shown in FIG. 9B, when the image gathering means 405 arranges the previously formed L-shaped combined images 1002, 1005 within the output images 1007 (FIG. 5: S113), as shown in FIGS. 10A and 10B, one selected image 902 remains (FIG. 5: YES in S114). In this case, the image gathering means 405 sets, without performing search for a horizontal selected image and a vertical selected image and formation of an L-shaped combined image, an outer corner 1010 (e.g., lower left corner) of the remaining selected image 1009 at inner corners 1011 (e.g., the middle upper right corners corresponding to edges of overlaid sides (adjacent sides) of the respective two selected images 1000 and 1001 and 1003 and 1004 where the respective two selected images 1000 and 1001 and 1003 and 1004 adjoin) of the L-shaped combined images 1002, 1005 in the output images 1007, as shown in FIGS. 10A and 10B, to arrange the remaining selected image 1009 within the output images 1007 (FIG. 5: S113). That is, the outer corner 1010 of the remaining selected image 1009 is set along respective two sides that defines the largest inner corners of the L-shaped combined images 1002, 1005 in the output images 1007 (e.g., an upper side 1000a of the selected image 1000 and a right side 1001c of the selected image 1001 or a right side 1003a of the selected image 1003 and an upper side 1004c of the selected image 1004) so that the remaining selected image 1009 is arranged within the output images 1007 (FIG. 5: S113). Thus, all of the selected images 1002, 1005, 1009 are arranged within each output images 1007 to be gathered. Since gathering is performed by the two adjunction/formation methods, there are, of course, two output images 1007 each of which includes the plurality of selected images 1002, 1005, 1009 after the arrangement. The output image 1007 according to the first adjunction/formation method is referred to as "output image 1", while the output image 1007 according to the second adjunction/formation method is referred to as "output image 2".

Referring to another example in which six selected images 1100 are present as shown in FIG. 11A, the image gathering means 405 searches a horizontal selected image 1101 having a maximum horizontal side and a vertical selected image 1102 having a maximum vertical side among the six selected images 1100 (FIG. 5: S110→S111). Next, as shown in FIGS. 11B and 11C, the aforementioned two adjunction/formation methods are executed to form two types of first largest L-shaped combined images 1103 from the horizontal selected image 1101 and the vertical selected image 1102 (FIG. 5: S112). Then, the image gathering means 405 arranges the formed two first L-shaped combined images 1103 within the respective output images 1104 (FIG. 5: S113).

Subsequently, the routine returns to S110, because the four selected images 1100 still remain (FIG. 5: YES in S114), to make the image gathering means 405 search the next largest horizontal selected image 1105 and the next largest vertical selected image 1106 among the four selected images 1100, thereby forming two types of second-largest second L-shaped combined images 1107 by the two adjunction/formation methods (FIG. 5: S110→S111→S112). That is, the image gathering means 405 searches a second horizontal selected image 1105, of which a horizontal side is maximum, and a second vertical selected image 1106, of which a vertical side is maximum, among the four selected images 1100 except the searched selected images 1101, 1102, and overlays one specific side of the second horizontal selected image on one specific side of the second vertical selected image to form the second combined image 1107 in which one side orthogonal to the overlaid side of the second vertical selected image is aligned with one side orthogonal to the overlaid side of the horizontal selected image.

Here, in order to form a plurality of L-shaped combined images, a predetermined one of the adjunction/formation methods is employed continually (fixed) for the formation, as shown in FIGS. 11B and 11C. That is, a plurality of vertical L-shaped combined images are formed successively by the first adjunction/formation method, while a plurality of horizontal L-shaped combined images are formed successively by the second adjunction/formation method.

Then, the image gathering means 405 arranges so as to stack the formed second L-shaped combined images 1107 on the first L-shaped combined images 1103 within the respective output images 1104 (FIG. 5: S113).

Finally, since the two selected images 1100 remain (FIG. 5: YES in S114), the routine returns to S110. Then, the image gathering means 405 searches the next horizontal selected image 1108 and the next vertical selected image 1109 from the two selected images 1100, forms the smallest third L-shaped combined images 1110 by the two adjunction/formation methods, and then arranges so as to stack the formed third L-shaped combined images 1110 on the second L-shaped combined images 1107 within the respective output images 1104 (FIG. 5: S110→S111→S112→S113).

In this way, in forming the plurality of L-shaped combined images 1103, 1107, 1110, the L-shaped combined images 1103, 1107, 1110 are arranged so as to be stacked one on the other. Accordingly, the plurality of selected images 1100 can be arranged and gathered efficiently with smaller blanks formed in the output images 1104.

Further, two types of the L-shaped combined images 1103, 1107, 1110 are formed by the two adjunction/formation methods. This enables formation of a combined image suitable for the paper direction that the user selects in advance from either type of images.

Subsequently, when no selected image 902 is present (FIG. 5: NO in S114), the image gathering means 405 compares each maximum vertical width 1013 of gathered images 1012 composed of the plurality of selected images after the arrangement with the vertical width 1014 of the output images 1007 and compares each maximum horizontal width 1015 of the gathered images 1012 with the horizontal width 1016 of the output images 1007, as shown in FIGS. 10A and 10B, to determine whether the maximum vertical width 1013 exceeds the vertical width 1014 of each output image 1007 and whether the maximum horizontal width 1015 exceeds the horizontal width 1016 of each output image 1007 (whether scale down is necessary) (FIG. 6: S202). It is noted that the vertical width 1014 and the horizontal width 1016 of each output image 1007 correspond to the vertical width and the horizontal width of an image capable of being displayed on the touch panel 201, respectively.

When the determination results in excess of the maximum vertical width 1013 of the gathered image 1012 over the vertical width 1014 of each output image 1007 or in excess of the maximum horizontal width 1015 of the gathered image 1012 over the horizontal width 1016 of each output image 1007 (FIG. 6: YES in S202), the image gathering means 405 compares a first ratio obtained by dividing the maximum vertical width 1013 by the vertical width 1014 of each output image 1007 with a second ratio obtained by dividing the maximum horizontal width 1015 by the horizontal width 1016 of each output image 1007 to specify a larger ratio. Then, the image gathering means 405 calculates a reduction ratio α, which is a reciprocal of the specified ratio (FIG. 6: S203), and scales down the gathered image 1012 as a whole by the reduction ratio α, as shown in FIGS. 10A and 10B, to set the specified ratio to be 1 (FIG. 6: S204). In other words, the image gathering means 405 sets the gathered images 1017 after scale down to be included within the output images 1007.

Figure 12A:
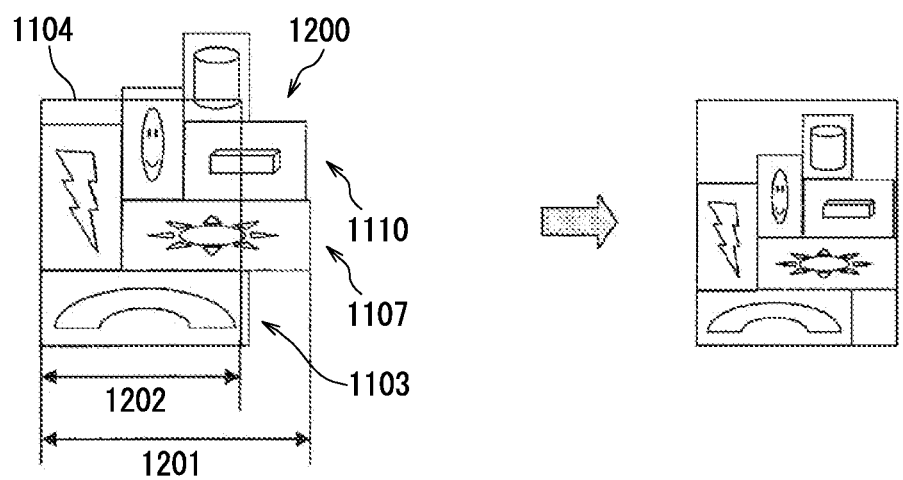
FIG. 12 presents a first illustration (FIG. 12A) showing one example of gathering of six selected images according to one embodiment of the present disclosure and a second illustration (FIG. 12B) showing one example of gathering of the six selected images according to the embodiment of the present disclosure.
Figure 12B:
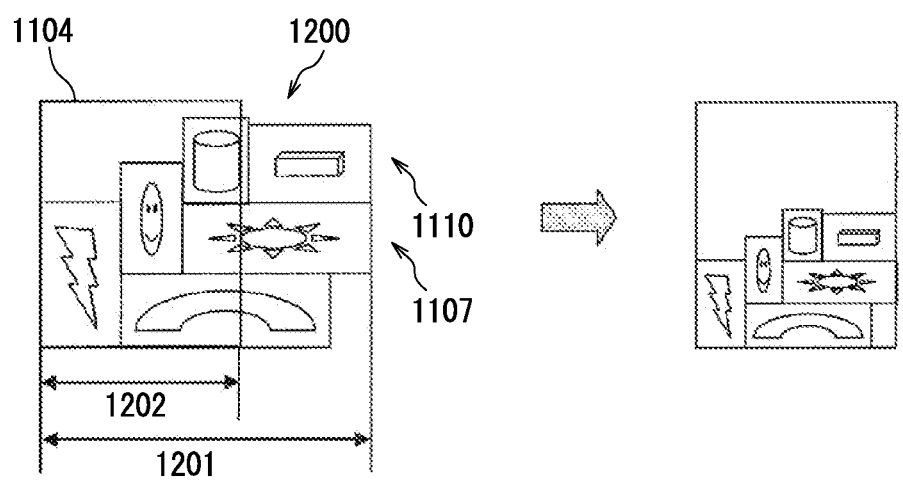

Thus, even the gathered images 1012, which are larger than the output images 1007 and extend beyond the blanks, can be set appropriately within the output images 1007. It is noted that the aforementioned determination and scale down are performed on each of the two gathered images 1012 formed by the two adjunction/formation methods. The gathered images 1012 shown in FIGS. 10A and 10B are scaled down by the respective reduction ratios α, which are reciprocals of ratios obtained by dividing the maximum horizontal widths 1015 of the gathered images 1012 by the horizontal width 1016 of each output image 1007. Also, as shown in FIGS. 12A and 12B, the gathered images 1200 obtained by gathering the six selected images 1100 (a plurality of L-shaped combined images 1103, 1107, 1110) shown in FIGS. 11B and 11C are scaled down by the reduction ratios α, which are reciprocals of ratios obtained by dividing the maximum horizontal widths 1201 of the gathered images 1200 by the horizontal width 1202 of each output image 1104.

On the other hand, when each maximum vertical width 1013 of the gathered images 1012 does not exceed the vertical width 1014 of each output image 1007, and each maximum horizontal width 1015 of the gathered images 1012 does not exceed the horizontal width 1016 of each output image 1007 (FIG. 6: NO in S202), the image gathering means 405 arranges the gathered images 1012 in the output images 1007 as it is (does nothing).

Thereafter, when the gathering and scale down are completed, the image gathering means 405 notifies the image selection means 403 of the gathering and the scale down. Upon receipt of the notification, the image selection means 403 makes the image gathering mode screen display the two output images 1007 (the output image 1 and the output image 2 shown in FIGS. 10A and 10B) in which the gathered images 1017 are arranged by the two adjunction/formation methods (FIG. 6: S205).

Figure 13A:
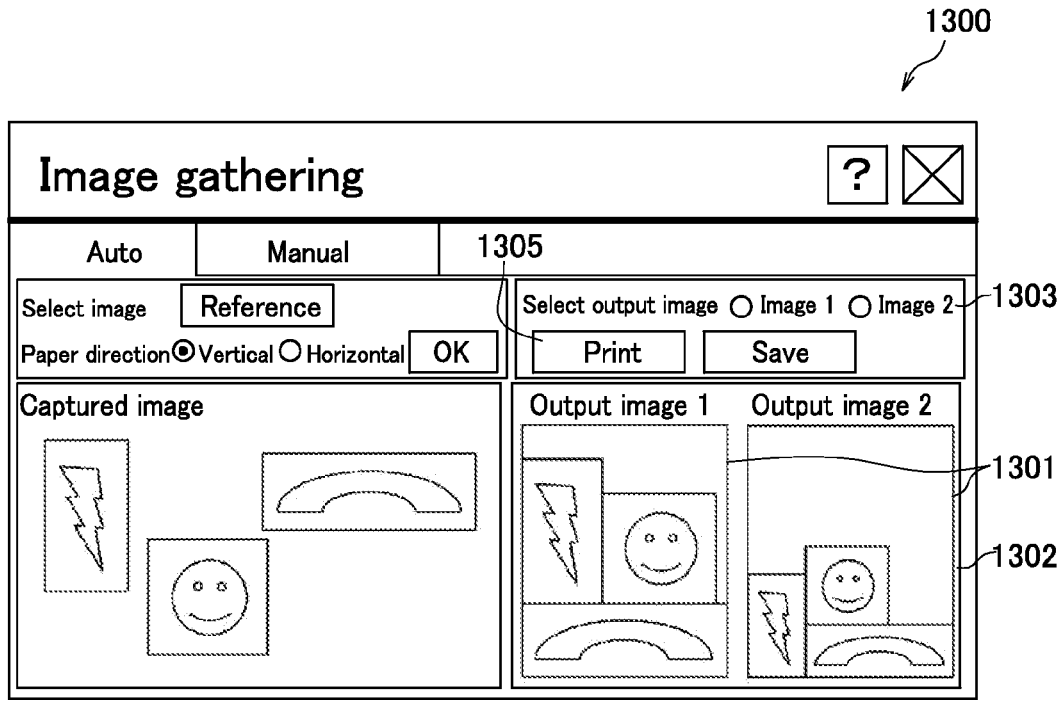
FIG. 13 presents a first illustration (FIG. 13A) showing one example of the image gathering mode screen that displays gathered images according to one embodiment of the present disclosure and a second illustration (FIG. 13B) showing the example of the image gathering mode screen that displays gathered images according to the embodiment of the present disclosure.

An image gathering mode screen 1300 displays in an output image field 1302 output images 1301 (the output image 1 and the output image 2), within which the gathered images are included, and displays the output image key 1303 for selection of the output images 1301 in a manner that can be pushed, as shown in FIG. 13A.

Thus, the plurality of selected image 902 can be automatically and efficiently gathered. Accordingly, it is unnecessary for the user to manually carry out gathering, thereby enabling omission of superfluous work. Further, the user can check a result of the automatically gathered selected images 902 through the image gathering mode screen 1300.

Figure 13B:
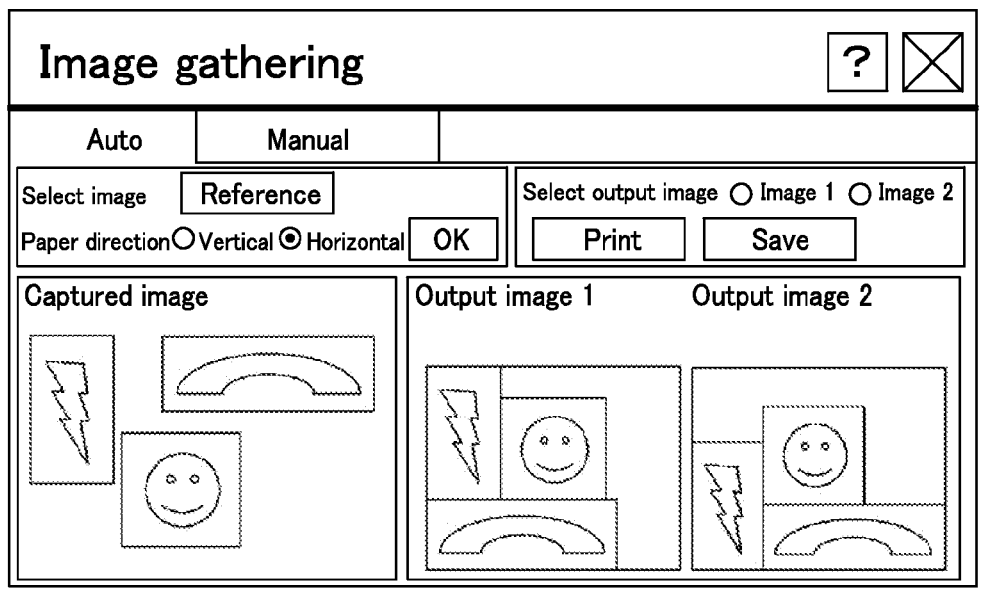

It is noted that where the paper direction is the vertical direction, the output images 1301 are displayed in the vertical direction, as shown in FIG. 13A. By contrast, where the paper direction is the horizontal direction, the gathering and scale down are performed according to the output images in the horizontal direction, so that the output images 1304 are displayed in the horizontal direction, as shown in FIG. 13B.

Next, when the user pushes the output image key 1303 that indicates a given output image 1301 (e.g., the output image 1), while viewing the image gathering mode screen 1300, and pushes the print key 1305, the image selection means 403 receives the pushing of the selected output image 1301 and the print key 1305 (FIG. 6: S206) to notify the image formation means 402 of each pushing. The notified image formation means 402 forms the selected output image 1301 on predetermined paper (FIG. 6: S201). This enables the user to obtain printed paper of the output image 1301 (gathered image) that he/she desires.

Incidentally, when the user pushes the manual mode key 910 without pushing the OK key 907 of the image gathering mode screen 900 in S109 (FIG. 5: NO in S109), the image selection means 403 receives the pushing of the manual mode key 910 (FIG. 5: YES in S115) to make an image gathering manual mode screen 1400 to be displayed for arrangement of the selected images 902 in an output image 904 according to the user's operation (FIG. 6: S207).

Figure 14A:
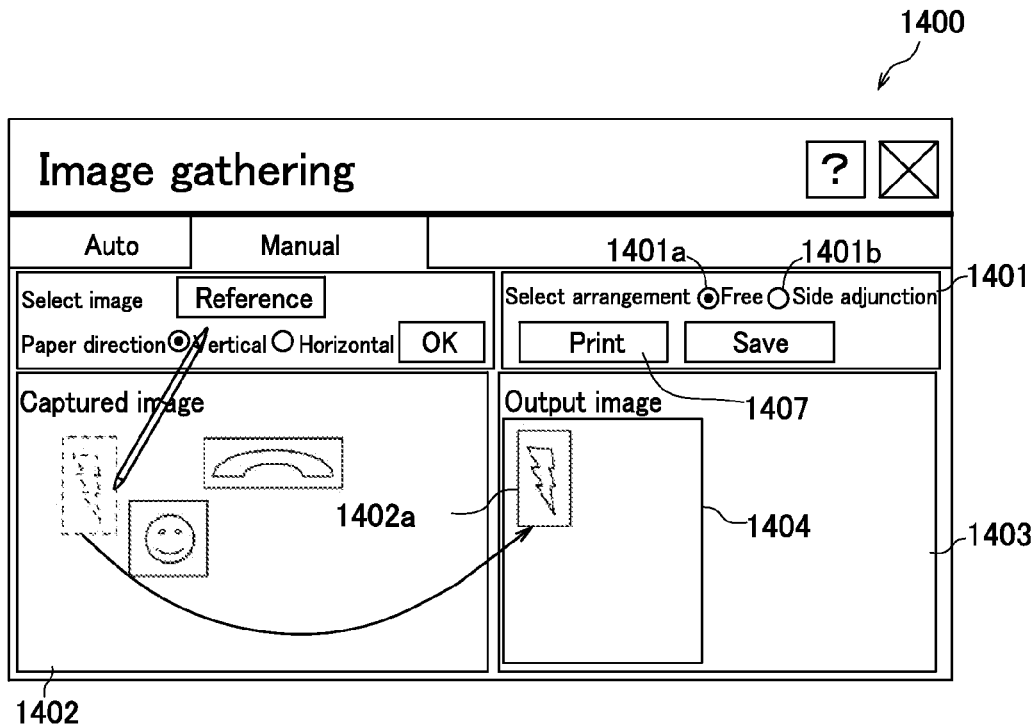
FIG. 14 presents a first illustration (FIG. 14A) showing one example of an image gathering manual mode screen according to one embodiment of the present disclosure and a second illustration (FIG. 14B) showing one example of the image gathering manual mode screen according to the embodiment of the present disclosure.

The image gathering manual mode screen 1400 displays layout keys 1401 (free key 1401a and side adjusting key 1401b) for selection of a method for arranging the selected images, as shown in FIG. 14A. Of the layout keys 1401, the free key 1401a is already pushed in advance which is used for freely arranging a selected image 1402a in a captured image field 1402 into an output image 1404 of an output image field 1403 (FIG. 6: S208).

When the user pushes (selects) the selected image 1402a in the captured image field 1402, while viewing the image gathering manual mode screen 1400, and arranges it in an output image 1404 of the output image field 1403 with the selected image 1402a pushed (drag and drop), the image selection means 403 receives the drag and drop (FIG. 6: YES in S209) to notify the image gathering means 405 of the drag and drop. The notified image gathering means 405 determines the type of the arrangement key 1401 (FIG. 6: S210).

Now, since the free key 1401a is being pushed, the notified image gathering means 405 determines that the arrangement key 1401 is the free key 1401a (FIG. 6: YES in S210) to arrange the dragged and dropped selected image 1402a directly in the output image 1404, as shown in FIG. 14A (FIG. 6: S211). Thus, the user can freely arrange the given selected image 1404 in a manual manner.

By contrast, when the user pushes the side adjunction key 1401b for arranging images so that one side of one selected image adjoins one side of another selected image in S208, the image gathering means 405 determines that the arrangement key 1401 is the side adjunction key 1401*b* (FIG. 6: NO in S210) and arranges the dragged and dropped selected image 1402*a* so that one side thereof adjoins one side of another selected image (FIG. 6: S212).

Figure 14B:
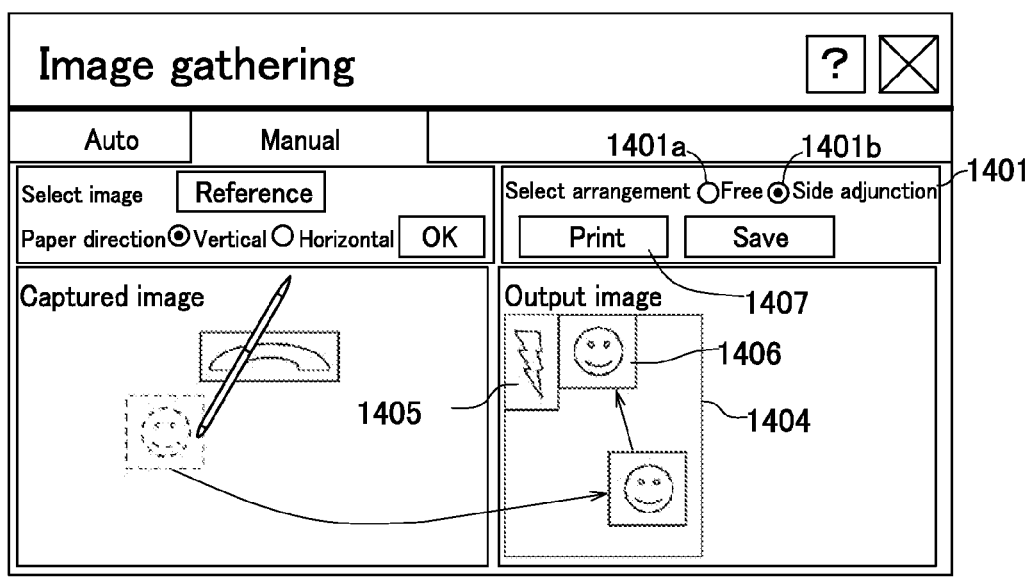

For example, when the user arranges a first selected image 1405 within the output image 1404 first, as shown in FIG. 14B, since no other selected image is present in the output image 1404, the image gathering means 405 arranges the first selected image 1405 so that one side thereof adjoins one side (e.g., side of the upper left corner) of the output image 1404 with the side of the output image 1404 regarded as a side of a selected image.

Subsequently, when the user arranges a second selected image 1406 within the output image 1404, the image gathering means 405 arranges the second selected image 1406 so that one side thereof adjoins one side of the first selected image 1405 in the output image 1404.

In this way, when the side adjunction key 1401*b* is pushed, the selected images 1405, 1406 arranged in the output image 1404 by the user's operation are automatically arranged so that their sides are adjacent to each other. Thus, gathering can be achieved with a smaller blank formed in the output image 1404.

Alternatively, when any selected image 1402*a*, 1405, 1406 extends beyond the output image 1404 in arranging the selected images 1402*a*, 1405, 1406 within the output image 1404 by the image gathering means 405 in S211 or S212, the image gathering means 405 may display a zoom/rotation screen for change in magnification or rotation of the selected image 1402*a*, 1405, 1406 in a popup manner to invite the user to change the magnification and/or rotate of the selected image. This enables the user to freely process the given selected image 1402*a*, 1405, 1406 so that the selected images can be included within the output image 1404.

When the user pushes the print key 1407, while viewing the image gathering manual mode screen 1400 in S211 or S212, the image selection means 403 receives the pushing of the print key 1407 (FIG. 6: YES in S213) to notify the image formation means 402 of each pushing. Upon receipt of the notification, the image formation means 402 forms the output image 1404 onto the predetermined paper (FIG. 6: S201). Thus, the user can obtain printed paper on which the freely gathered output image 1404 is printed.

As described above, the image processing device 400 according to the present disclosure includes the image selection means 403 configured to receive a plurality of rectangular selected images 902 selected by the user's operation and the image gathering means 405 configured to overlay specific sides of two selected images 902 on each other among the plurality of selected images 902 to gather the plurality of selected images 902 within the output image 904 (rectangular) corresponding to the predetermined paper.

Accordingly, the plurality of selected images 902 can be automatically gathered within the output image 1301 with a blank reduced. This can achieve efficient gathering of the plurality of selected images 902 and reduce labor in gathering by the user's operation.

It is noted that in the embodiment of the present disclosure, the image gathering means 405 is, but is not limited to be, configured to scale down the gathered image 1017 by a predetermined reduction ratio when the maximum vertical width 1013 of the gathered image 1017 exceeds the vertical width 1014 of each output image 1007, or when the maximum horizontal width 1015 of the gathered image 1017 exceeds the horizontal width 1016 of each output image 1007. For example, a configuration may be employed in which where only predetermined part of the gathered image 1017 is desired to be reflected in the output images 1007, the image selection means 403 makes the zoom/rotation screen to be displayed for change in magnification and/or rotation of the gathered image 1017 so that the image gathering means 405 changes the magnification of and/or rotates the gathered image 1017 according to the user's operation.

Further, in the above embodiment of the present disclosure, the image gathering means 405 gathers the selected images 902 having various horizontal sides and various vertical sides. Alternatively, in the case of gathering of square selected images of which sizes are all the same, for example, the following process may be employed.

That is, where six square selected images 1500 with sides having the same size are present, as shown in FIG. 15A, the image gathering means 405 searches a firstly-selected selected image 1501 and a secondly-selected selected image 1502 among the six selected images 1500 according to the order of the user's selection. Then, as shown in FIGS. 15B and 15C, combined images are formed by the two adjunction/formation methods.

Here, since the firstly-selected selected image 1501 and the secondly-selected selected image 1502 are the same in size, a first vertically long combined image 1503 is formed by the first adjunction/formation method, while a first horizontally long combined image 1504 is formed by the second adjunction/formation method. Then, the image gathering means 405 arranges the first vertically long combined image 1503 and the first horizontally long combined image 1504 respectively within predetermined output images 1505.

Next, the image gathering means 405 searches a thirdly-selected selected image 1506 and a fourthly-selected selected image 1507, forms a second vertically long combined image 1508 and a second horizontally long combined image 1509 by the two adjunction/formation methods, and then arranges the second vertically long combined image 1508 and the second horizontally long combined image 1509 along the first vertically long combined image 1503 and the first horizontally long combined image 1504, respectively.

Here, in arranging the second vertically long combined image 1508 along the first vertically long combined image 1503, an outer corner 1510 of the second vertically long combined image 1508 is set at a predetermined part 1511 of the first vertically long combined image 1503 (part corresponding to an edge of an overlaid side (adjacent side) of the two selected images 1501, 1502 where the two selected images 1501, 1502 adjoin, which corresponds to the inner corner of an L-shaped combined image). That is, the second vertically long combined image 1508 is arranged so that the outer corner 1510 of the second vertically long combined image 1508 is set at the edge 1511 located differently from an edge in contact with a side where the two selected images 1501, 1502 align, out of the two edges of the side (adjacent side) where the two selected images 1501, 1502 are overlaid.

By contrast, in arranging the second horizontally long combined image 1509 along the first horizontally long combined image 1504, an outer corner 1512 of the second horizontally long combined image 1509 is set at a predetermined part 1513 of the first horizontally long combined image 1504 (part corresponding to an edge of an overlaid side (adjacent side) of the two selected images 1501, 1502 where the two selected images 1501, 1052 adjoin, which corresponds to the inner corner of an L-shaped combined image). That is, the second horizontally long combined image 1059 is arranged so that the outer corner 1512 of the second horizontally long combined image 1509 is set at the edge 1513 located differently from an edge in contact with a side where the two selected images 1501, 1502 align, out of the two edges of the side (adjacent side) where the two selected images 1501, 1502 are overlaid.

Next, the image gathering means 405 searches a fifthly-selected selected image 1514 and a sixthly-selected selected image 1515, forms a third vertically long combined image 1516 and a third horizontally long combined image 1517 by the two adjunction/formation methods, and then arranges the third vertically long combined image 1516 and the third horizontally long combined image 1517 along the second vertically long combined image 1508 and the second horizontally long combined image 1509, respectively, as described above.

Here, when the aforementioned arrangement according to the above embodiment is employed, both the arrangement of the plurality of vertically long combined images 1503, 1508, 1516 and the arrangement of the plurality of horizontally long combined images 1504, 1509, 1517 form stepwise images with large blanks, as shown in FIGS. 15B and 15C. Accordingly, as described above, in the case where the plurality of square selected images 1500 with sides having the same size are present, the plurality of vertically long combined images 1503, 1508, 1516 may be arranged so that their lower sides are aligned to form a single horizontally long image 1518, and the plurality of horizontally long combined images 1504, 1509, 1517 may be arranged so that their left sides are aligned to form a single vertically long image 1519. With this configuration, the plurality of images can be gathered with blanks reduced as small as possible.

Moreover, in the above embodiment of the present disclosure, the image gathering means 405 gathers the plurality of selected images 902 within a single output image 1012. Alternatively, the plurality of selected images 902 may be divided and gathered in a plurality of output images according to the user's operation.

Furthermore, in the above embodiment of the present disclosure, the image processing device 400 includes the respective means. However, it is possible that a program that realizes the respective means is stored in a storage medium, and the storage medium is provided. In this configuration, the program is read out to the multifunction peripheral 100 to allow the multifunction peripheral 100 to realize the respective means. In this case, the program itself read out from the storage medium serves to exert the operation and effects in the present disclosure. Further, the configuration can be provided as a method for allowing a hard disk to store steps executed by the respective means.

In addition, in the above embodiment of the present disclosure, the multifunction peripheral 100 includes the touch panel 201. However, a mouse, a key board, etc. may be connected in place of the touch panel 201. Operation of the mouse or the key board results in input of a setting condition. Further, the image processing device is not limited to a part of the multifunction peripheral 100 and may be a part of a personal computer or a mobile communication terminal.

What is claimed is:

1. An image processing device comprising:
   a computing circuitry;
   a non-transitory, computer-readable storage medium stored thereupon instructions which when executed by the computing circuitry performs the following steps:
   receives a plurality of rectangular selected images selected by user's operation; and
   overlays specific sides of two selected images on each other among the plurality of selected images to gather the plurality of selected images within an output image corresponding to predetermined paper by
   searching for a first horizontal selected image having a maximum horizontal side among the plurality of selected images;
   searching for a first vertical selected image having a maximum vertical side among the plurality of selected images except the horizontal selected image;
   overlaying one specific side of the first horizontal selected image on one specific side of the first vertical selected image to form a first combined image in which one side orthogonal to the overlaid side of the first vertical selected image is aligned with one side orthogonal to the overlaid side of the first horizontal selected image; and
   arranging the first combined image within the output image.

2. The image processing device of claim 1, wherein the first combined image has an L-shape.

3. The image processing device of claim 2, wherein
   when the plurality of selected images include three or more selected images, performing the additional steps:
   searches for a second horizontal selected image having a maximum horizontal side or a second vertical selected image having a maximum vertical side among the plurality of selected images except the first horizontal selected image and the first vertical selected image that have been searched for; and
   arranges the second horizontal or vertical selected image so that one corner of the second horizontal or vertical selected image is set along two sides that define a largest inner corner of the L-shaped first combined image.

4. The image processing device of claim 1, wherein
   when the plurality of selected images include four or more selected images, performs the following additional steps:
   searches for a second horizontal selected image having a maximum horizontal side among the plurality of selected images except the first horizontal selected image and the first vertical selected image that have been searched for;
   searches for a second vertical selected image having a maximum vertical side among the plurality of selected images except the first horizontal selected image, the first vertical selected image, and the second horizontal selected image that have been searched for; and
   overlays one specific side of the second horizontal selected image on one specific side of the second vertical selected image to form a second combined image in which one side orthogonal to the overlaid side of the second vertical selected image is aligned with one side orthogonal to the overlaid side of the second horizontal selected image.

5. The image processing device of claim 4, wherein said specific sides of the first horizontal selected image and the first vertical selected image are both a horizontal side.

6. The image processing device of claim 4, wherein said specific sides of the first horizontal selected image and the first vertical selected image are both a vertical side.

7. The image processing device of claim 5 or 6, wherein when the plurality of selected images are square images of the same size, performs the following additional steps:
   arranges the second combined image so that one corner of the second combined image is set at an edge of the first combined image that is different from an edge in contact with a side where the first vertical selected image and the first horizontal selected image align, out of two edges of a side where the first horizontal selected image and the first vertical selected image are overlaid.

8. The image processing device of claim 1, wherein
when a maximum vertical length of a gathered image composed of the plurality of selected images exceeds a vertical length of the output image or when a maximum horizontal length of the gathered image composed of the plurality of selected images exceeds a horizontal length of the output image after repetition of overlaying of the specific sides of two selected images, the image gathering section scales down the gathered image so that the gathered image is included within the output image.

9. The image processing device of claim 1,
further arranges the selected images at a position in the output image which corresponds to user's operation according to user's selection.

10. An image processing method comprising:
receiving a plurality of rectangular selected images selected by user's operation; and
gathering the plurality of selected images within an output image corresponding to predetermined paper by overlaying specific sides of two selected images on each other among the plurality of selected images, wherein
the gathering involves:
searching for a horizontal selected image having a maximum horizontal side among the plurality of selected images;
searching for a vertical selected image having a maximum vertical side among the plurality of selected images except the horizontal selected image;
overlaying one specific side of the horizontal selected image on one specific side of the vertical selected image to form a combined image in which one side orthogonal to the overlaid side of the vertical selected image is aligned with one side orthogonal to the overlaid side of the horizontal selected image; and
arranging the combined image within the output image.

11. A non-transitory computer readable storage medium that stores a program which allows a computer to execute:
receiving a plurality of rectangular selected images selected by user's operation; and
gathering the plurality of selected images within an output image corresponding to predetermined paper by overlaying specific sides of two selected images on each other among the plurality of selected images, wherein
the gathering involves:
searching for a horizontal selected image having a maximum horizontal side among the plurality of selected images;
searching for a vertical selected image having a maximum vertical side among the plurality of selected images except the horizontal selected image;
overlaying one specific side of the horizontal selected image on one specific side of the vertical selected image to form a combined image in which one side orthogonal to the overlaid side of the vertical selected image is aligned with one side orthogonal to the overlaid side of the horizontal selected image; and
arranging the combined image within the output image.

* * * * *